United States Patent [19]
Gaskin et al.

[11] Patent Number: 5,275,696
[45] Date of Patent: Jan. 4, 1994

[54] STAINLESS STEEL SURFACE TREATMENT

[75] Inventors: Georgette B. Gaskin, Hatfield, Pa.;
Gabriel J. Pilla, Pennsauken, N.J.;
Stanley R. Brown, Danboro, Pa.;
robert B. Bonk, Lake Owassa, N.J.

[73] Assignee: The United States of America as represented by the Secretary of the Navy, Washington, D.C.

[21] Appl. No.: 57,370

[22] Filed: May 3, 1993

[51] Int. Cl.$^5$ .......................... B44C 1/22; C23F 1/00
[52] U.S. Cl. ......................................... 156/664; 134/3;
134/28; 134/40; 134/41; 156/629; 156/645;
156/651; 252/79.2; 252/79.3
[58] Field of Search ............... 156/629, 634, 645, 635,
156/639, 651, 654, 656, 664; 427/309; 134/3,
28, 40, 41; 252/79.2, 79.3, 79.4

[56] References Cited

U.S. PATENT DOCUMENTS

| | | | |
|---|---|---|---|
| 3,280,038 | 10/1966 | Morris | 156/664 |
| 3,598,741 | 8/1971 | Kanno | 252/79.3 |
| 4,610,798 | 9/1986 | Burkus | 156/664 |
| 5,108,544 | 4/1992 | Hakansson | 156/644 |
| 5,185,057 | 2/1993 | Playdon | 156/664 |

*Primary Examiner*—William Powell
*Attorney, Agent, or Firm*—James V. Tura; James B. Bechtel; Susan E. Verona

[57] ABSTRACT

A process for preparing a stainless steel surface for bonding to an adhesive is described. First, the surface is wiped with a solvent and then soaked in an alkaline bath at an elevated temperature to remove dirt and grease. The surface is then rinsed with water and immersed in a 135-°F. to 145-°F. solution containing from 25 to 35 volume-percent sulfuric acid in water for a period of time equal to the length of time it takes for a reaction on the surface to commence plus about 4 to 8 minutes. Next, the surface is immersed in a solution at ambient temperature containing from 28 to 35 volume-percent nitric acid and from 2 to 3 volume-percent hydrofluoric acid in water for about 4 to 8 minutes, and then rinsed with water and dried.

7 Claims, No Drawings

STAINLESS STEEL SURFACE TREATMENT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to a surface treatment for stainless steel, and more particularly to a treatment for preparing a stainless steel surface for bonding to an adhesive.

Adhesively bonded stainless steel components often fail at the interface between the adhesive and the oxide layer at the surface of the stainless steel, or within the oxide layer itself. The surface of a stainless steel part that is to be bonded to an adhesive must therefore be particularly treated to impart certain characteristics to it prior to contact with the adhesive if a good, lasting bond is to be formed therewith. The stainless steel surface must be clean and smut-free, because any dirt, grease, smut, or other impurity will interfere with a proper bond being made. The surface must also be properly passivated, meaning it must be inert to the surrounding environment, have the proper thickness, be well-adhered to the base stainless steel, and provide durable adhesion sites for attachment to the adhesive. An unstable or insufficiently passivated surface is subject to moisture adsorption, particularly when the bond is subjected to cyclic stresses from thermal or mechanical loads. This leads to passivation breakdown and corrosion. A third characteristic important to good bonding is a degree of surface roughness sufficient to provide good mechanical interlocking with the adhesive.

SUMMARY OF THE INVENTION

It is therefore a general object of the present invention to provide a process for treating a stainless steel surface prior to application of an adhesive thereto which will improve the quality of the bond therebetween.

It is a more specific object to provide a process for cleaning, etching, passivating, and desmutting a stainless steel surface prior to application of an adhesive thereto.

These and other objects are accomplished by cleaning the surface and then immersing it in a 135-° F. to 145-° F. solution containing from 25 to 35 volume-percent sulfuric acid in water for a period of time equal to the length of time it takes for a reaction on the surface to commence plus about 4 to 8 minutes, and then immersing it in a solution at ambient temperature containing from 28 to 35 volume-percent nitric acid and from 2 to 3 volume-percent hydrofluoric acid in water for about 4 to 8 minutes. The surface is then rinsed and dried and the adhesive is applied thereto in accordance with the manufacturer's instructions.

Other objects, advantages and novel features of the present invention will become apparent from the following detailed description thereof.

DESCRIPTION OF THE PREFERRED EMBODIMENT

The process of the present invention is for use on stainless steel surfaces in general and more particularly on AISI 301 stainless steel surfaces. The surface to which the adhesive is to be bonded is first cleaned to remove all dirt and grease therefrom. Cleaning is preferably performed by applying a cleaning solvent to the surface and wiping it clean. One such solvent is 1,1,1 trichloroethane. Grease is then removed from the surface by immersing it in an alkaline bath at an elevated temperature. For instance, the surface can be immersed in Oakite 164 (Oakite Products) alkaline solution at 140° F. to 180° F. for 5 to 10 minutes. The surface is then preferably immersed in a tank of room-temperature deionized water for 5 minutes and then spray-rinsed with room-temperature deionized water for 2 minutes.

The clean stainless steel surface is then etched and passivated by immersing it in a 135-° F. to 145-° F. solution containing from 25 to 35 volume-percent sulfuric acid in water for a period of time equal to the length of time it takes for a reaction on the surface to commence plus about 4 to 8 minutes. The surface may be immersed in the solution for 1 minute and then raised above the solution until the acid starts to react with the surface (approximately 5 minutes). The surface may then be lowered into the solution for the required time. The surface may also be rubbed with a piece of plain carbon steel to help initiate the etching process.

The etched and passivated stainless steel surface is then immersed in a solution at ambient temperature containing from 28 to 35 volume-percent nitric acid and from 2 to 3 volume-percent hydrofluoric acid in water for about 4 to 8 minutes. This removes smut without affecting the roughness or integrity of the passivated surface. The surface should then be rinsed. This may be done by rinsing the surface in deionized water at ambient temperature for 2 to 5 minutes. At this point the surface may be wiped with a clean cheese cloth to test for the presence of smut on the surface. If smut is still evident or if the surface displays a water break condition, the surface may be reimmersed in the nitric acid and hydrofluoric acid solution and then rerinsed in deionized water. The surface should then preferably be rinsed in 130-° F. to 150-° F. water for 2 to 4 minutes.

The surface should then be dried by letting it drip dry for 10 minutes within 1 hour after rinsing and then oven-drying it for 10 to 20 minutes at 135° F. to 150° F. Primer and adhesive may then be applied to the surface according to the manufacturer's instructions. The primer should preferably be applied within 20 to 30 minutes of completion of drying. The process of the invention is most effective for epoxy adhesive films that are approximately 5 mils thick.

Stainless steel treated according to the above described process will have a stable passivated surface resistant to further reactions, capable of withstanding cyclic loads, and capable of forming a good bond with the adhesive.

The process of the invention will now be described in more detail with reference to the following example.

EXAMPLE

Several AISI 301 stainless steel panels were treated according to the invention in the following manner. Each panel was first wiped with a clean white cheesecloth soaked in 1,1,1 trichloroethane until no residue was visible on the cheesecloth. Then each panel was immersed in a 140-° F. to 180-° F. oF Oakite 164 alkaline solution (Oakite Products) for 5 to 10 minutes. Next each panel was immersed in a tank of room-temperature deionized water for 5 minutes and then spray-rinsed with room-temperature deionized water for 2 minutes. Each panel was then immersed in a 135-° F. to 145-° F. solution of 25 to 35 volume-percent sulfuric acid in deionized water for a period of time equal to the length of time it took for a reaction on the surface to commence (determined visually) plus 4 to 8 minutes. Next, each panel was immersed in a room-temperature solution of 28 to 35 volume-percent nitric acid and 2 to 3 volume-percent hydrofluoric acid in deionized water for 4 to 8 minutes. Each panel was then rinsed in deionized water at room temperature for 2 to 5 minutes and then rinsed in 130-° F. to 150-° F. water for 2 to 4 minutes, after which each panel was allowed to drip dry for 10 minutes, then oven-dried for 10 to 20 minutes at 135° F. to 150° F. The primer and adhesive were then applied to the treated surface according to the manufacturer's instructions.

Two other groups of 301 stainless steel panels were treated by standard methods for purposes of comparison. One comparison group (C.G. I) was treated as just described, but instead of being immersed in a room-temperature solution of 28 to 35 volume-percent nitric acid and 2 to 3 volume-percent hydrofluoric acid in deionized water for 4 to 8 minutes, each panel was immersed in a solution of sulfuric acid (22 to 28 weight percent), sodium dichromate (2 to 3 weight percent), and deionized water (balance of solution) for 1 to 5 minutes at 140° F. to 160° F. Each panel was then immersed in room-temperature deionized water for 2 to 5 minutes, and then in 140-° F. to 160-° F. deionized water for 1 to 3 minutes. Each panel was then immediately placed in a 160-° F. oven (filtered air) until dry. The primer and adhesive were then applied according to the manufacturer's instructions.

The other comparison group (C.G. II) was treated as follows. Each panel was wiped with a white cheesecloth soaked in 1,1,1 trichloroethane until no residue was visible on the cheesecloth. The area to be bonded was blasted with a slurry of 30% to 50% 220-grit aluminum oxide in deionized water at a nozzle pressure of 50 to 70 psi until a matte finish was evident. Each panel was then flushed with deionized water to remove slurry from the blasted surfaces and then wiped with a clean white cheese cloth soaked in 1,1,1 trichloroethane until no residue was visible on the cheesecloth. Each panel was then immersed in a solution of 18 to 22 volume-percent sulfuric acid and 0.02 to 0.35 volume-percent Nacconol NR (National Airline Division of Allied Chemical Co.) in 170-° F. to 200-° F. deionized water for the length of time it took for the solution to gas vigorously plus 4 to 10 minutes. Next, each panel was rinsed in room-temperature deionized water for 2 to 5 minutes. The panels were then treated the same as were those according to the invention, from being immersed in a solution of nitric acid and hydrofluoric acid to application of the adhesive.

All panel surfaces were bonded to other panel surfaces that were treated in the same manner, using EC3917 primer and a 5 mil-thick AF163-2K epoxy film adhesive (both 3M products). Wedge crack extension tests were performed in accordance with ASTM-D-3762 on all panels. Crack measurements were taken after 1, 4, 24, and 672 hours of exposure to 100% relative humidity at 140° F. in a humidity chamber. The results of the tests are shown in the TABLE.

TABLE

| | Average Wedge Crack Growth (inches) | | | | |
|---|---|---|---|---|---|
| | Initial Length | 1 Hour Exposure | 4 Hours Exposure | 24 Hours Exposure | 672 Hours Exposure |
| Invention | 0.9100 | 0.9250 | 0.9480 | 0.9560 | 0.9960 |
| C.G. I | 1.0780 | 1.1040 | 1.1082 | 1.1352 | 1.2387 |
| C.G. II | 1.0850 | 1.0980 | 1.1110 | 1.1210 | 1.1346 |

It can be seen that the panel surfaces treated according to the invention exhibited slower crack growth rates, which is indicative of more durable bonding.

Those skilled in the art will appreciate that other embodiments and modifications of the present invention are possible, and are intended to be included within the scope of the following claims.

What is claimed is:

1. A process for preparing a stainless steel surface for bonding to an adhesive, comprising the steps of:
    a. cleaning the surface;
    b. immersing the surface in a 135-° F. to 145-° F. solution containing from 25 to 35 volume-percent sulfuric acid in water for a period of time equal to the length of time it takes for a reaction on the surface to commence plus about 4 to 8 minutes;
    c. immersing the surface in a solution at ambient temperature containing from 28 to 35 volume-percent nitric acid and from 2 to 3 volume-percent hydrofluoric acid in water for about 4 to 8 minutes;
    d. rinsing the surface; and
    e. drying the surface.

2. The process of claim 1, wherein said step of cleaning the surface comprises the steps of:
    applying a cleaning solvent to the surface;
    immersing the surface in an alkaline bath at an elevated temperature; and
    rinsing the surface with water.

3. The process of claim 2, wherein the surface is immersed in the alkaline bath for about 5 to 10 minutes at 140° F. to 180° F.

4. The process of claim 2, wherein the surface is rinsed by immersing the surface in water at ambient temperature for about 5 minutes and then spray-rinsing the surface with water at ambient temperature for about 2 minutes.

5. The process of claim 1, wherein said rinsing step comprises the steps of rinsing the surface in water at ambient temperature for about 2 to 5 minutes and then rinsing the surface in 130-° F. to 150-° F. water for about 2 to 4 minutes.

6. The process of claim 1, wherein said drying step comprises the steps of allowing the surface to drip dry for about 1? minutes, and then oven-drying the surface for about 10 to 20 minutes at 135° F. to 150° F.

7. A process for preparing a stainless steel surface for bonding to an adhesive, comprising the steps of:
    a. applying a cleaning solvent to the surface;
    b. immersing the surface in an alkaline bath at an elevated temperature;
    c. rinsing the surface with water;
    d. immersing the surface in a 135-° F. to 145-° F. solution containing from 25 to 35 volume-percent sulfuric acid in water for a period of time equal to the length of time it takes for a reaction on the surface to commence plus about 4 to 8 minutes;
    e. immersing the surface in a solution at ambient temperature containing from 28 to 35 volume-percent nitric acid and from 2 to 3 volume-percent hydrofluoric acid in water for about 4 to 8 minutes;
    f. rinsing the surface with water; and
    g. drying the surface.

* * * * *

UNITED STATES PATENT AND TRADEMARK OFFICE
CERTIFICATE OF CORRECTION

PATENT NO. : 5,275,696
DATED : January 4, 1994
INVENTOR(S) : Georgette B. Gaskin et al.

It is certified that error appears in the above-identified patent and that said Letters Patent is hereby corrected as shown below:

Column 4, line 50, "1?" should read --10--.

Signed and Sealed this

Thirty-first Day of May, 1994

Attest:

BRUCE LEHMAN

*Attesting Officer*   *Commissioner of Patents and Trademarks*